United States Patent
Pinto

(10) Patent No.: US 6,240,050 B1
(45) Date of Patent: May 29, 2001

(54) METHOD OF RESETTING SONAR IMAGES USING SECONDARY ANTENNA

(75) Inventor: Marc Pinto, Brest (FR)

(73) Assignee: Thomson Marconi Sonar S.A.S., Valbonne (FR)

( * ) Notice: Subject to any disclaimer, the term of this patent is extended or adjusted under 35 U.S.C. 154(b) by 0 days.

(21) Appl. No.: 09/341,662

(22) PCT Filed: Jan. 13, 1998

(86) PCT No.: PCT/FR98/00050

§ 371 Date: Jul. 19, 1999

§ 102(e) Date: Jul. 19, 1999

(87) PCT Pub. No.: WO98/32031

PCT Pub. Date: Jul. 23, 1998

(30) Foreign Application Priority Data

Jan. 17, 1997 (FR) .................................................. 97 00487

(51) Int. Cl.[7] .................................................... G01S 15/89
(52) U.S. Cl. ............................................................. 367/11
(58) Field of Search ................................ 367/88, 11, 104, 367/106

(56) References Cited

U.S. PATENT DOCUMENTS

| 4,930,111 | * | 5/1990 | Sullivan et al. | ...................... 367/106 |
| 4,987,563 | * | 1/1991 | Gilmour | .................................. 367/88 |

* cited by examiner

*Primary Examiner*—Daniel T. Pihulic
(74) *Attorney, Agent, or Firm*—Oblon, Spivak, McClelland, Maier & Neustadt, P.C.

(57) ABSTRACT

A method of readjusting sonar images using sub-antennae. For each point of the bottom, a sub-antenna is constructed of a given size at one end of the physical antenna. A first channel is constructed over a short time slice centered on the point. A sub-antenna is also constructed upon recurrence No. 2 of the same size as the first one, but at the opposite end of the physical antenna. With the second sub-antenna, a plurality of second channels is formed over a sector which is sufficiently wide to contain the point. These second channels are intercorrelated with the first channel so as to adopt the one which maximizes the intercorrelation peak. This procedure is repeated for different sub-antenna sizes and one is adopted which produces the maximum of the preceding intercorrelations. The best estimate of the position of the point in the second sonar image is deduced from the azimuth shifts between the first channel and the best second channel, from the intercorrelation delay between these channels and from the best sub-antenna size.

11 Claims, 7 Drawing Sheets

REC. 1: TRANSMISSION AT $T_1$ AND RECEPTION AT $T_2$

REC. 2: TRANSMISSION AT $T_1$ AND RECEPTION AT $T_3$ ($T_1$ AND $T_2$ ARE SHIFTED BY $2vT$)

DIAGRAM

METHOD OF RESETTING SONAR IMAGES USING SECONDARY ANTENNA

BACKGROUND OF THE INVENTION

1. Field of the Invention

The present invention relates to a method of readjusting the images from a synthetic-antenna sonar, which is formed by the shifting of a linear antenna of transducers with length L. All the transducers are active in reception and some of them are also active in transmission. The transmitters may also not form part of the antenna.

2. Discussion of the Background

Synthetic antennae are known in which a virtual antenna is formed from the different spatial positions of a physical antenna.

When the nominal motion (without movement error) of the carrying vehicle is collinear with the physical antenna, a synthetic linear antenna is obtained. One known embodiment relates to lateral sonars for seabed imaging, for which the synthetic antenna makes it possible considerably to enhance the lateral resolution.

When the nominal motion of the carrying vehicle is perpendicular to the physical antenna, a bidimensional synthetic antenna is obtained, often having gaps. One embodiment relates to frontal minehunting sonars. The synthetic antenna then allows supplementary antenna gain with respect to the physical antenna in order to enhance the performance in terms of detection and classification. This enhancement results from the fact that the coherence, from one recurrence to the next, of the echo from a mine is generally higher than that of a bottom echo, which is itself higher than that of the noise.

The focusing of a synthetic antenna at a given point F, however, requires compensation for the differences in outwards and return path between F and the physical sonar for all the K consecutive recurrences which it is desired to integrate. However, an error in the movement of the carrying vehicle of $\lambda/4$ between two consecutive recurrences, i.e. less than a millimeter in the case of the wavelengths usual in mine-classifying sonar $\lambda=3.75$ mm for $f_o=400$ kHz), is sufficient to sum the echoes originating from F in anti-phase rather than in phase and thus to destroy the synthetic antenna. The instrumentation, which moreover is complex and expensive, does not have the required precision. Moreover, when movement errors are present, the corrections to be made to the path differences depend on the projection of these errors in the radial direction of F, which depends on the relief of the bottom. However, this remains unknown when the physical antenna is, as assumed here, a linear antenna which exhibits a conical ambiguity. Auto-focusing is then one particularly attractive solution. It makes it possible to get round the difficulties relating to the separate measurement of the movement of the carrying vehicle, of the relief of the bottom and of the profile of instantaneous ultrasonic velocity. In place of that, the combinations of these quantities are estimated, namely the differences in path length, which are required for the problem posed.

A French patent, No. 94 11464 is known, filed by ICPI of Lyons, with J. Chatillon and J. Magand [1] as inventors, which aims to define such an auto-focusing method. In contrast to the present invention, this method does not take advantage of the multi-sensor structure of the physical antenna. It assumes, moreover, that the scene imaged can be segmented into regions including a single diffuser. It is therefore inapplicable in the case, important in minehunting, where the scene imaged includes only one anechoic mine against a bottom of uniform reverberation, for example a homogeneous bottom of mud or fine sand (in this case the mine is detected by the shadow it casts). This is because even the smallest region which can be segmented in the imaged scene, which is nothing more than the resolution cell of the sonar, still contains a continuous infinity of diffusers, according to the conventionally accepted model for describing a bottom of uniform reverberation.

A U.S. Pat. No. 4,224,036, granted on Jan. 6, 1981 to Westinghouse Electric Corp. is also known, with R. S. Raven as inventor, in which is described a method of auto-focusing for a synthetic-antenna lateral sonar, which can operate even against a bottom of uniform reverberation. This method makes it possible to integrate two consecutive recurrences, the extension to the case of K recurrences being done step by step. It uses at least one transducer being shifted in reception mode between these two recurrences. The transducer is shifted relative to the physical antenna in such a way that its center of phase, defined as the place which is the geometric middle of the center of the transmission antenna and of the transducer, remains nominally fixed relative to the water. It is seen in FIG. 1 that it has to be shifted by $\Delta R=2$ vT in the direction opposite the movement of the sonar, where vT is the nominal motion of the carrying vehicle between two recurrences. Such a motion is possible on condition that L>2 vT, that is to say that the synthetic antenna is oversampled spatially.

Under these nominal conditions, the signals at recurrences No. 1 and No. 2 from the shifted transducer are identical. In the presence of errors, a non-zero phase shift between the two complex samples relative to the echoes from the same range cell of the bottom would be observed, according to the method of this patent [2]. This phase shift would then furnish the phase correction to be applied, range cell by range cell, to the signals from all the transducers of recurrence No. 2 so as to integrate them with the signals of recurrence No. 1. It should be noted, however, that the application of the method requires preliminary readjustment, by another method not specified by the patent [2], of the paired complex samples the precision of which should be a fraction of 1/B where B is the passband of the sonar.

This method [2] also describes an extension to the case of the simultaneous use of several shifted transducers. This is because, when the synthetic antenna is sufficiently over-sampled spatially, it is possible to shift at least two transducers in reception mode, to estimate at least two phase shifts according to the preceding method, and to extrapolate these multiple estimates to a phase-shifting law varying linearly along the physical antenna. This compensation law is then applied to the signals from the transducers at recurrence No. 2 in such a way as to achieve, in addition to a constant phase correction, electronic aiming-off of the physical antenna at recurrence No. 2.

Finally the method [2] also makes mention of the possibility of shifting the transmitter by 2 vT, which allows the simultaneous use of all the transducers of the physical antenna, resulting in a gain in precision. However, a problem is posed, described by the inventor of [2], when it is sought continuously to readjust a series of consecutive recurrences. Hence the backward movement of the transmitter by 2 vT between recurrences No. 1 and No. 2 makes it possible to readjust this pair of recurrences but not the recurrences No. 2 and No. 3, since the transmitter has arrived at the end stops of the physical antenna. It is only possible, in fact, to readjust every other pair of recurrences.

Another problem, not described by the inventor of [2], is that the shift on transmission cancels the nominal movement of the center of phase of the physical sonar in such a way that there is no longer spatial diversity, and thus no gain in resolution, for the coherent integration of the two recurrences thus readjusted. Auto-focusing is thus obtained at the expense of the performance of the synthetic antenna which is clearly not desirable.

The modes of shifting on transmission which are proposed in the U.S. patent application No. 9,510,953 filed on Sep. 19, 1995 in the name of Thomson-CSF [3] make it possible to overcome these two limitations. One of these modes uses two alternate auxiliary transmissions (alternating at each recurrence), which are carried out with pairwise codes distinct from each other, and distinct from the main transmission code, carried out with a fixed transmitter. The three codes are, for example, in distinct sub-bands, which makes it possible to separate them by filtering on reception. Thus, for every pair of recurrences of a continuous series, there always exists one of the two auxiliary sub-bands in which it is possible to shift on transmission in the direction opposite to the movement of the carrying vehicle. With these shifting movements being in sub-bands unconnected to the main transmission, moreover, they have no effect on the imaging. All types of spectral multiplexing are possible, for example those making it possible, by beating, to form two auxiliary codes, spectrally unconnected but with the same central frequency as the main transmission.

However, certain fundamental limitations of the method [2] persist. The fact that the shift on reception or on transmission is determined by the nominal movement vT of the carrying vehicle, without taking account of movement errors, is a source of inaccuracy. Moreover, the method [2] assumes that it is possible to apply the same phase corrections for all the diffusers F of the same range cell. This condition of isotropy of phase errors is known in optics by the name of isoplanetism. The method is applicable only in the case where the transmission sector in its entirety can be regarded as an isoplanetic sector which is a limitation, in practice, as the following example shows.

In an Oxyz reference system as in FIG. 2, the seabed is above the plane Oxyz and the sonar is being nominally shifted along Ox. It is assumed that the only parasitic effect is a heave effect of amplitude P along Oz between two consecutive recurrences. This heave means that the positions $C_1$ and $C_2$ of the centers of phase of a shifted transducer are no longer coincident. The co-ordinates along Ox and Oy are equal, by construction, but it is otherwise along Oz, where the parasitic movement leads to a vertical separation of P between the two points, illustrated in FIG. 2. It can then clearly be seen from the Figure that the phase error is not the same for the diffusers $F_1$ and $F_2$ of the range cell. This is because $C_1C_2$ can be seen as a synthetic interferometric base along Oz, with resolution of $\lambda/2P$, so that the phase error can be assumed to be constant only if the variation in azimuth, relative to the axis of the interferometric base, of the echoes from the range cell remains of the order of $\lambda/16P$. For P=10 cm and $\lambda$=3.75 mm, the maximum allowable variation is about 0.1°. It is therefore sufficient, at a range of 200 m and for the grazing incidences usual in minehunting, to have altitude variations of the order of 50 cm in the range cell in order to reach the limits of the method. For a transmission sector of 5°, the range cell situated at 200 m extends along Ox over more than 20 m. It is therefore sufficient for a bottom which is flat but inclined by 10% relative to Oxy in order to have altitude variations of more than 2 m. Extended dunes, or ridges, the amplitude of which lies between 40 cm and 1 m, are also frequent on the seabed. This analysis is, obviously, not limited to the case of heave alone and range cells at the limit of range. In mid-range or at the start of range, combinations of parasitic yaw and heave produce identical effects. The same goes for attitude errors. Hence, for $L_r$=4 m and pitching of only 1.5°, P=10 cm is already reached.

In the presence of such angular variations, the constant phase shift estimated by method [2] loses its meaning.

In order to attempt to increase the robustness of method [2], patent application [3] proposes forming auxiliary transmissions with finer beams than that of the main transmission. In one embodiment, the auxiliary beams are of 2° whereas the main beam is of 8°. However, in order to have all the gain in resolution of the synthetic antenna, the phase errors have to be estimated over the entire main transmission sector of 8° and not only over a sub-sector of 2°. It would be necessary at least to cover the main transmission sector with a plurality of auxiliary transmissions with beams as fine as possible, the transmissions being in unconnected sub-bands according to the known technique of channel formation on transmission.

This analysis reveals the fundamental limitation of the system of shifted transducers. They do not have sufficient angular resolution to estimate the angular variations of the phase errors which are sought.

The problem posed can be formulated as follows. Let F be a point on the bottom defined by the pair of sonar co-ordinates (u, τ) relative to the recurrence 1. Let u=cos θ, where θ is the azimuth of F relative to the physical antenna and τ the round-trip propagation delay, as in FIG. 3. The co-ordinates of F at recurrence 2 are sought, in order to form the synthetic antenna. These can be expressed as a function of the co-ordinates (u, τ) at recurrence 1 in the form:

$$u+\Delta u(u, \tau), \tau+\Delta \tau(u, \tau) \qquad (1)$$

The problem posed is that of estimating the shifts Δu and Δτ of (1), for all (u, τ) of physical image No. 1, from the sonar signals alone. It is posed in an identical way for all the synthetic modes implemented with a linear antenna (lateral sonar, frontal sonar, etc.) and especially for the modes described above.

It is also posed in the same way for all the applications aiming precisely to pair two images of the same region of the bottom for the purposes of navigation readjustment or objective designation. Numerous image processing techniques are known for doing this, which are used for radar or optical images, based on extracting significant points from images No. 1 and No. 2 and pairing them. However, these techniques do not operate against a flat bottom with uniform reverberation, which is a limitation in sonar where the density of the noteworthy points (often of human origin) is much lower than in radar. The image processing techniques aiming to carry out intercorrelation of the two images do not have this limitation but come up against other difficulties. On the one hand, the shifts Δu and Δτ are not constant over the image, and, on the other hand, the coefficient of correlation of these images is low, close to 1–2 vT/L for a lateral sonar against a bottom of uniform reverberation.

There is also known, from a U.S. Pat. No. 4,635,240 granted to the Westinghouse company on Jan. 6, 1987, with G. Geohegan and C. W. Allen [4] as inventors, a navigation system using a frontal sonar to estimate the amplitude and the direction of the horizontal shifting of the carrying vehicle between two recurrences. This method makes use of the intercorrelation of channels formed with the physical antenna assuming that the antenna is stabilized in attitude, the vertical movement of the carrying vehicle is known, as well as the depth of water. The bottom is, moreover, assumed to be flat. Unlike the method according to the invention, this method requires the aid of navigation sensors and makes assumptions as to the relief, which makes it too imprecise for the applications envisaged here. Moreover, it does not deal with the case of lateral sonar.

SUMMARY OF THE INVENTION

In order to resolve the problem posed, the invention proposes a method of readjusting sonar images by means of sub-antennae, characterized principally in that, over two successive recurrences No. 1 and No. 2, for a point F determined by its co-ordinates in the sonar image at recurrence No. 1, two equal portions of the physical antenna are chosen, situated at the opposite ends thereof and forming two sub-antennae, in that, with the first sub-antenna, a first channel is formed aimed at F, and with the second sub-antenna a plurality of second channels are formed distributed over a sector which is sufficiently wide to contain F, and in that that one of the second channels is adopted which maximizes the intercorrelation peak between the first channel and each of the second channels, which, jointly with the two sub-antennae, determines the co-ordinates of F in the sonar image at recurrence No. 2.

According to another characteristic, these operations are repeated for the two directions of shifting and for a plurality of sizes of sub-antenna, in order to adopt the direction and the size which maximizes the said maxima of the intercorrelation peaks.

According to another characteristic, these operations are repeated for a grid of points F of the sonar image at recurrence No. 1, which makes it possible to use the quantities estimated for a point adjacent to F as initial conditions, and to readjust the whole of the two images between the successive recurrences.

According to another characteristic, a joint estimate is made for an entire subset of points of the grid, by introducing a parametric model of the variations in the quantities sought over the subset.

According to another characteristic, at least one supplementary transmitter is additionally used, and at least one supplementary transmission code.

BRIEF DESCRIPTION OF THE DRAWINGS

Other features and advantages of the invention will emerge clearly from the following description, presented by way of non-limiting example with respect to the annexed figures which represent.

DETAILED DESCRIPTION OF THE PREFERRED EMBODIMENTS

The innovation consists in forming channels constructed with a sub-antenna shifted in reception. The formation of channels affords an immediate response to the problems relating to the lack of angular resolution identified above, since it makes it possible to take advantage of the directional nature of the sub-antenna in order to estimate the angular variations sought. Against a non-uniform bottom, (textured bottoms leading to modulation of the reverberation, transitions between different bottoms, shadows or target echoes, etc.) the formation of channels makes it possible to use the sub-antenna gain in order to enhance the signal-to-noise ratio, giving a gain in the estimation precision which is added to the preceding gain in angular resolution.

Figure 5:
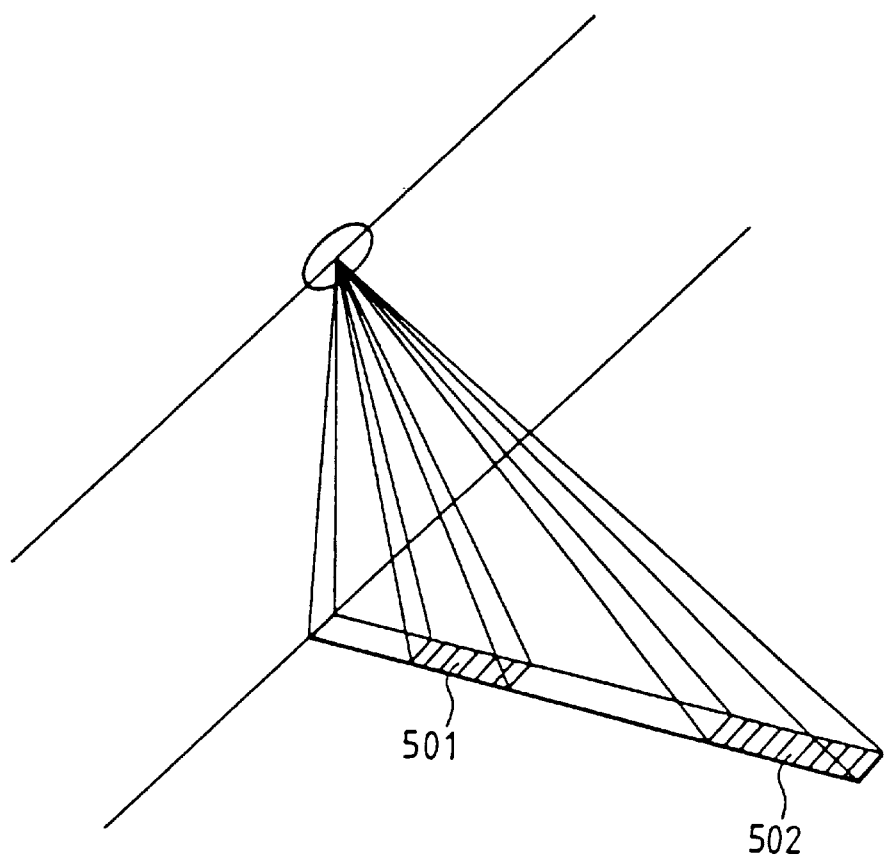
FIG. 5, a representation of the time slices over which the intercorrelations making it possible to estimate the shifts are performed.

A first embodiment relates to synthetic linear antennae. In order to estimate the shifts $\Delta u$ and $\Delta \tau$ relative to a given point F, defined by its sonar co-ordinates $(u, \tau)$ at recurrence No. 1, a sub-antenna is firstly constructed, shifted in reception. At recurrences No. 1 and No. 2, the sub-antenna is at the end stop of the array at the two opposite ends of it in such a way that its shifting between observations No. 1 and No. 2 takes place in the direction opposite to the lateral shifting of the sonar as in FIG. 6. The only parameter remaining for completely defining the sub-antenna is therefore its size. An initial size is first of all chosen arbitrarily, for example L-2 vT. Next, with the sub-antenna at recurrence No. 1, a first channel is formed aimed at F, over a short time slice centered on F. These slices, represented in FIG. 5, contain sufficient independent samples to estimate the intercorrelation delay with the required precision, but nevertheless remain sufficiently short for the variation in the radial direction within a slice to be negligible. Their size therefore also varies with $\tau$, the slices possibly being longer at the end of range (502) than at the start of range (501).

Figure 6:
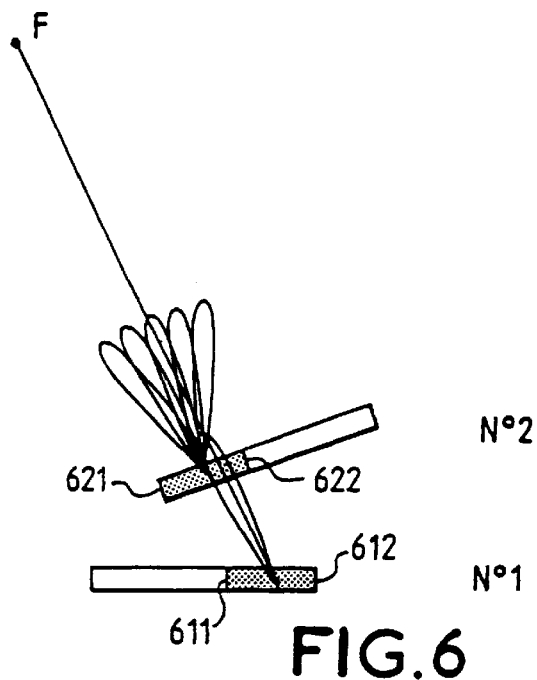
FIG. 6, a representation of a sub-antenna shifted in reception between recurrences No. 1 and No. 2 of the first channel aimed at a bottom echo F, and of a plurality of second channels allowing a search for F at recurrence No. 2.

Next, with the sub-antenna at recurrence No. 2, a plurality of second channels are formed in the vicinity of an initial estimate of the azimuth of F at recurrence No. 2 (in the absence of such an estimate, the channels are formed over the entire transmission sector) as in FIG. 6. Next these second channels are intercorrelated with the first channel, and the second channel is adopted which maximizes the intercorrelation peak. The intercorrelation is performed according to techniques which are completely conventional in interferometry with a wide passband B, used, moreover, in sonar for acoustic location, and which consist in jointly exploiting the intercorrelation delay, measured to a fraction of 1/B, and the phase at the intercorrelation peak in order to obtain a more precise estimate of this delay.

The shifts in azimuth $\Delta u'$ and the intercorrelation delay $\Delta \tau'$ between the first and second channels adopted, corresponding to the optimal sub-antenna, are interpreted as the shifts in F expressed in a sonar co-ordinate system attached to the sub-antenna. In order to change to the shifts $\Delta u$ and $\Delta \tau$, relating to the co-ordinate system attached to the entire antenna, a co-ordinate change has to be carried out making it possible to move, at observation No. 1, from the antenna to the sub-antenna and the inverse change has to be carried out upon observation No. 2. These co-ordinate changes are well known and are summarized in FIG. 7.

The preceding operations are then repeated for a grid of F points covering physical image No. 1. The shifts $\Delta u$ and $\Delta \tau$, as well as the size of the sub-antenna shifted, which are estimated for a point adjacent to F, then furnish excellent initial conditions for the estimate of the same quantities relative to F.

The angular resolution of the estimate is fixed by the size of the sub-antenna, and the timewise resolution by that of the time slices. These resolutions also fix the maximum dimensions of the meshes of the estimation grid, the estimated shifts possibly being smoothed and interpolated so as to reconstruct an estimate to the pitch, generally much finer, of the synthetic image.

In an extension of the method a joint estimate is produced, for a subset U of the points of the grid, of the quantities previously estimated separately for each point F (namely the best size of sub-antenna, the shift in azimuth and the intercorrelation delay between the first channel and the best second channel). To do this, a parametric model of the variations over U of these quantities is introduced (for example, these quantities are constant, or else some of them vary over U linearly in u and $\tau$). Next, for all the points of U, the intercorrelations between the first and second channels are summed, taking account of the variations in the model, and the parameters of the model which maximize this sum are sought. This extension makes it possible to increase the number of independent points in the intercorrelations, and thus the estimation accuracy, while limiting the non-stationary aspects relating to the variations in the radial direction in U.

Figure 7:
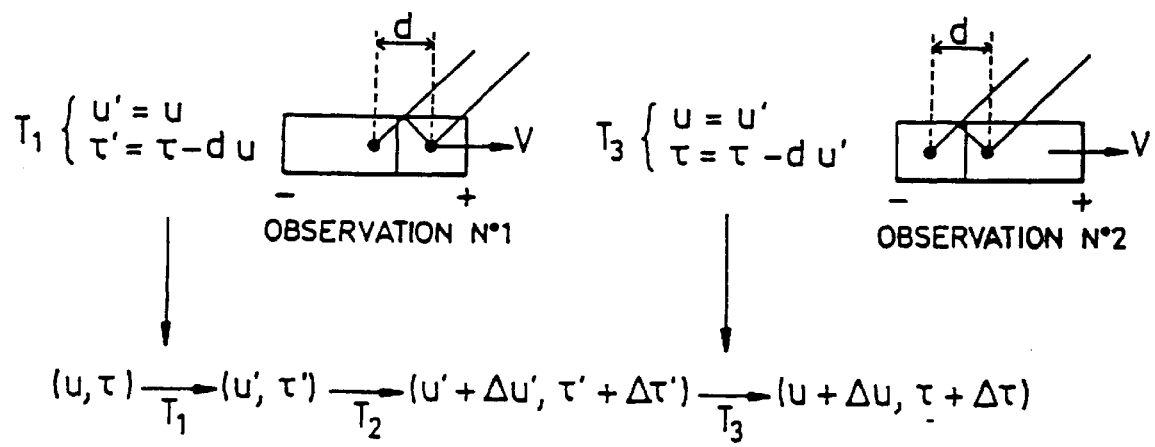
FIG. 7, a diagram making it possible to illustrate the changes in sonar co-ordinates between the antenna and the sub-antenna.

When the transmission sector is sufficiently narrow for the estimated quantities to be assumed to be constant over the entire sector, or else when this case is arrived at by prior spatial filtering, it is thus possible to produce a joint estimate for all the points of the grid in the same time slice. A particular case of the preceding extension consists in segmenting physical image No. 1 into time slices and in forming, for each time slice, two sonar images with the sub-antennae No. 1 and No. 2, and in intercorrelating them. Next, the two sonar co-ordinates of the peak of this bidimensional intercorrelation are sought, and the sub-antenna size is made to vary in order to adopt the one which produces the maximum of the intercorrelation peaks. Finally, the relationships of FIG. 7 are used, where $\Delta u'$ and $\Delta \tau$ are given by the sonar co-ordinates of the intercorrelation peak.

A variant consists in forming dummy transducers the signals from which are the intercorrelations, over the preceding time slices, of the paired transducers of sub-antennae No. 1 and No. 2. Thus, the transducer at the end 611 of sub-antenna No. 1 is paired with the transducer at the end 621 of sub-antenna No. 2 and so on, from one to another, as far as the transducers at the ends 612 and 622. Next the set of these dummy transducers is regarded as a dummy sub-antenna, with which a sonar image is formed in which the maximum amplitude point is sought. Next, the sub-antenna size is made to vary in order to adopt the size which produces the maximum of the maxima. Finally, the relationships of FIG. 7 are used, where $\Delta u'$ and $\Delta \tau'$ are given by the sonar co-ordinates of this latter maximum. This variant is equivalent to the preceding one on a bottom with uniform reverberation, but less precise in the general case, since no advantage is taken of the sub-antenna gain to enhance the signal-to-noise ratio.

It is also possible, although less accurate, to estimate the sub-antenna size separately by using the physical antenna as a spatial correlation log. These logs are known, which consist in intercorrelating the transducers two by two at recurrences No. 1 and No. 2 in order to adopt a pair which forms the correlation maximum. The size of the sub-antenna is then $L-\Delta R$, where $\Delta R$ is the distance between the two transducers of such a pair, measured along the physical antenna. This method can also be used to determine an initial sub-antenna size in all the variants of the method.

Figure 1:
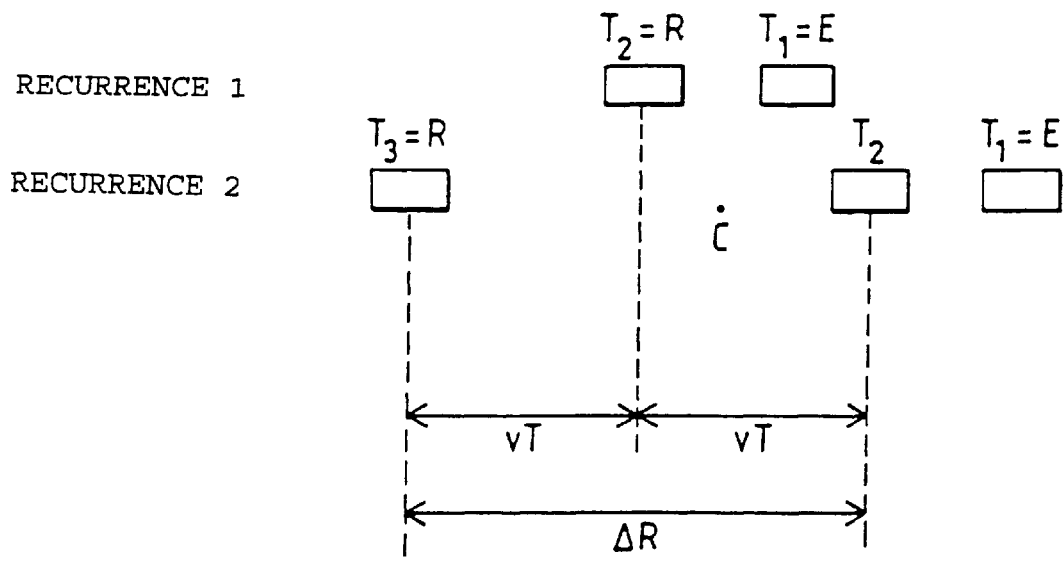
FIG. 1, a representation of a transducer shifted in reception mode used by the prior art.
Figure 2:
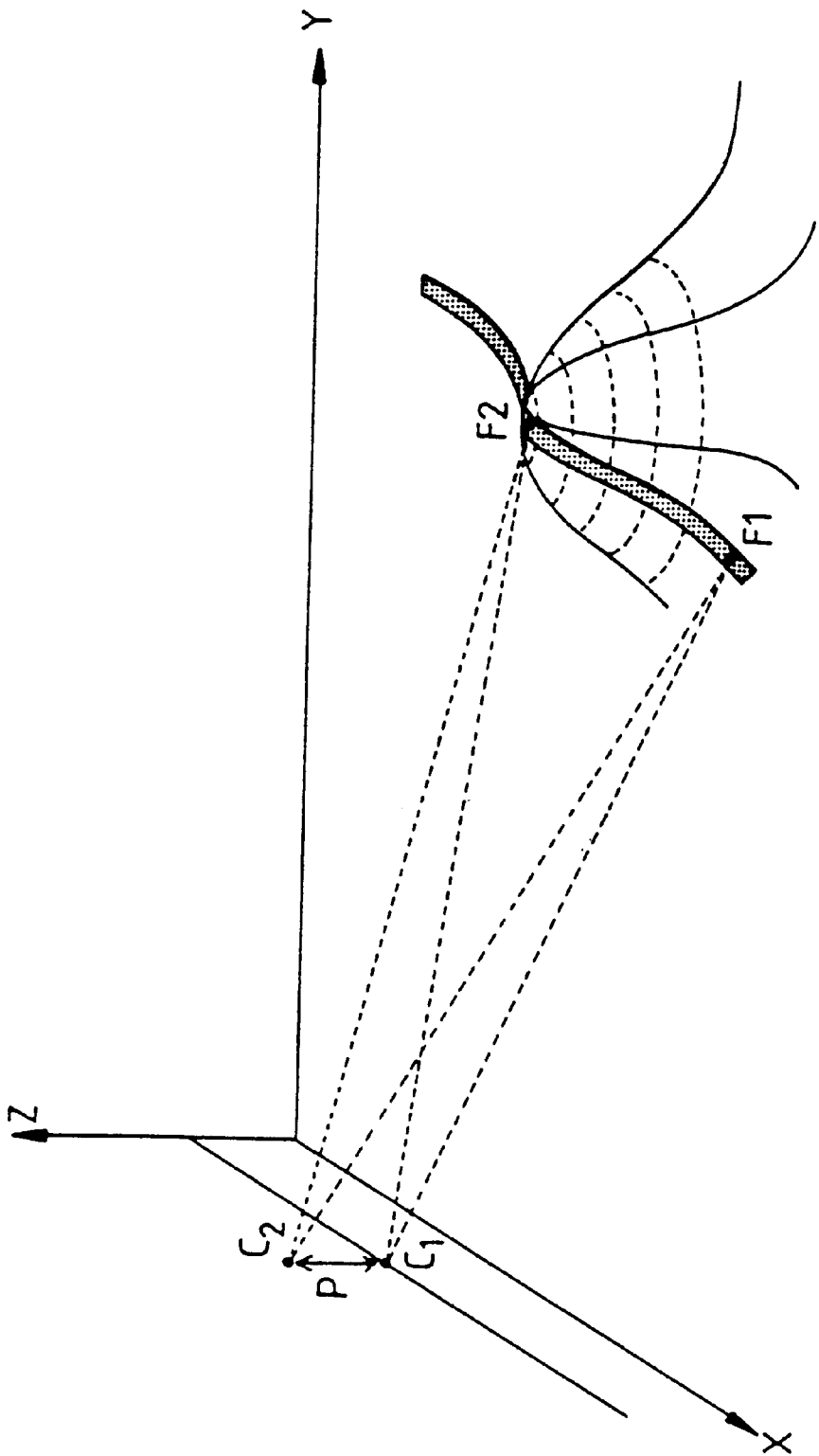
FIG. 2, a view of the bottom of the sea obtained using a sonar exhibiting a vertical heave, making it possible to reveal the limitations of the prior art.
Figure 3:
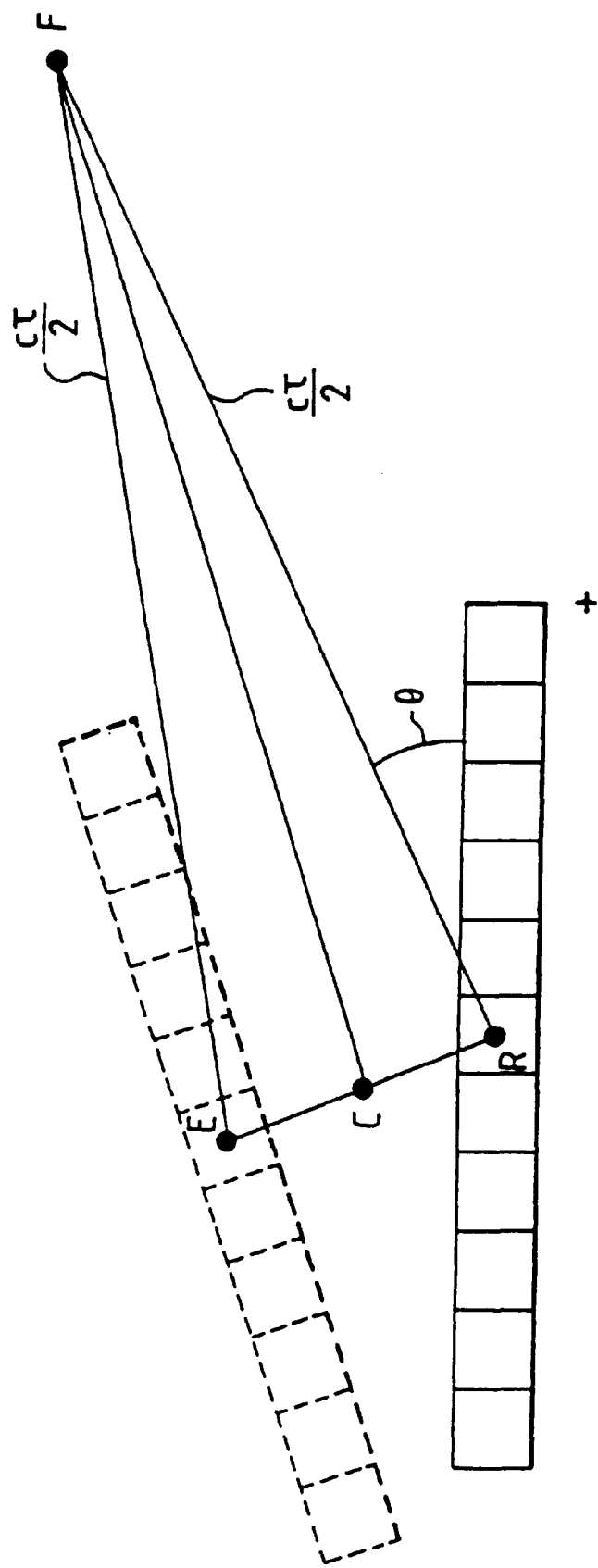
FIG. 3, a view of a physical antenna on transmission and reception, making it possible to define the parameters used.
Figure 4:
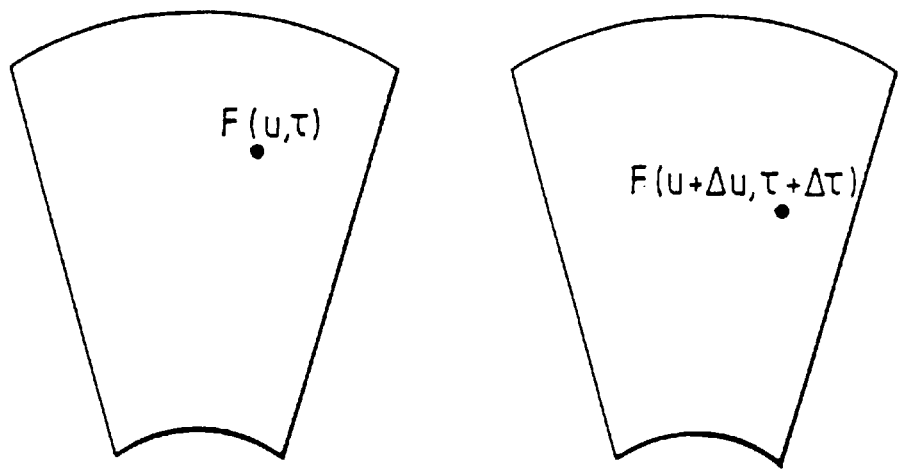
FIG. 4, two successive sonar images obtained with the physical antenna, making it possible to illustrate the shifting in the image of a bottom echo.
Figure 8:
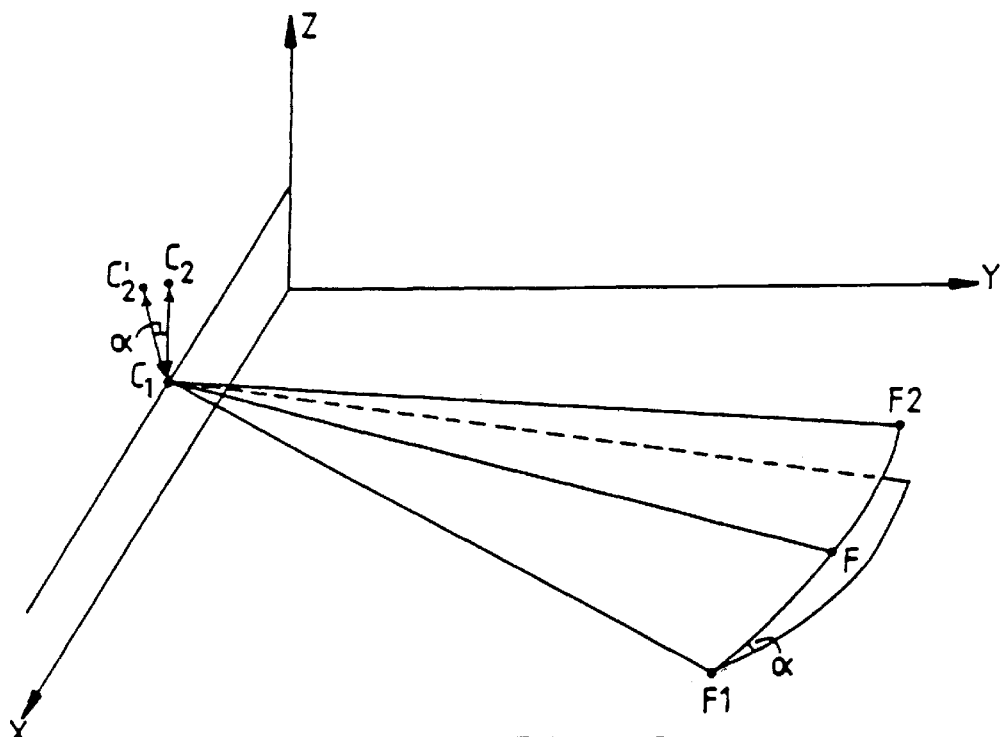
FIG. 8, a representation of the positions of the centers of phase which are shifted relative to the invention and to the prior art.

In the invention, the shifting on reception $\Delta R$ takes account of the movement errors and of the relief of the bottom unlike the prior art. To see this, the conditions of the preceding discussion under FIG. 2 are revisited, assuming, moreover, that the sub-antenna is of sufficient resolution to segment a region of the bottom which is approximately flat but inclined by an angle $\alpha$ relative to the horizontal plane Oxy as in FIG. 8. $C_2$ is, as in FIG. 2, the position of the second center of phase recommended by the prior art, while $C_2'$ is the second position recommended by the invention, the one which produces the correlation maximum. This is because $F_1$ and $F_2$ are not at the same azimuth relative to the interferometric base $C_1 C_2$, so that they can be resolved if the amplitude of the heave and the inclination of the bottom are sufficient. Put another way, the phase error is not the same for all the points of the resolution cell, particularly for $F_1$ and for $F_2$, which leads to a partial decorrelation of the reverberation signals at $C_1$ and $C_2$. It is different for the interferometric base $C_1 C_2'$, the axis of which is perpendicular to the bottom so as to bring $F_1$ and $F_2$, and all the points of the resolution cell, to the same azimuth relative to $C_1 C_2'$. The phase error is then the same for all the diffusers, which restores the correlation.

Figure 9:
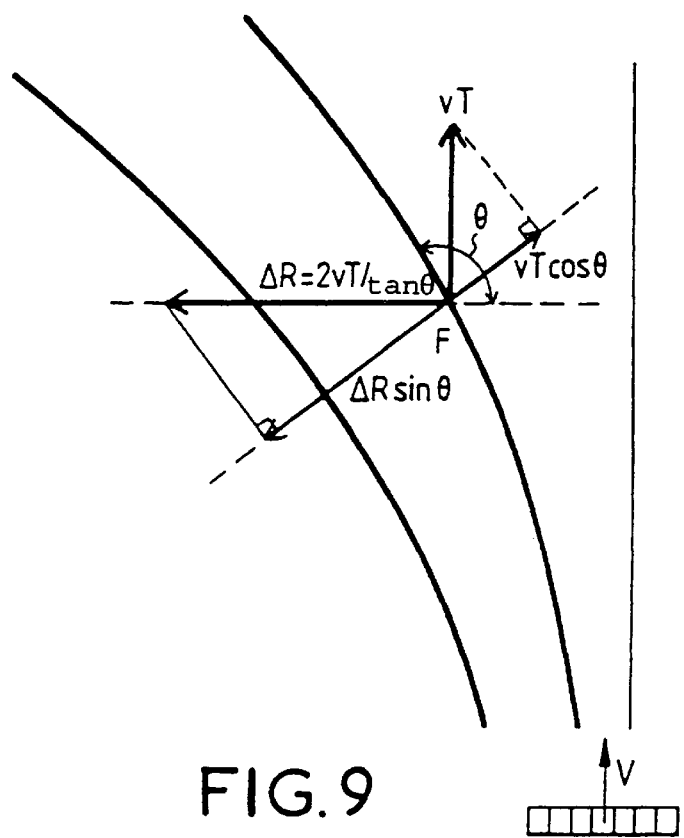
FIG. 9, a representation of the shifting of the sub-antenna for a frontal sonar and for a bottom echo to port.

The method extends to all synthetic modes implemented with a linear antenna, and particularly to the frontal sonar. The only difference is the direction of the movement on reception. For a lateral sonar, the direction is always the same for all points F and it is opposite to the movement of the carrying vehicle. For a frontal sonar, the shifting aims to cancel out the component of the movement perpendicular, in the plane tangent at F to the bottom, to the constant-azimuth hyperbola passing through F. It is seen in FIG. 9 that the movement has to be from starboard to port for a bottom echo F to port and vice-versa. For a point F close to the central axis, the movement errors mean that the direction of the shift cannot obviously be determined a priori. In this case, the preceding method is applied simultaneously to two sub-antennae shifted in opposite directions, and that direction is adopted for which the correlation peak is a maximum.

One fundamental constraint on implementing the method remains the size $L-\Delta R$ of the sub-antenna which should be as large as possible in order to enhance the directional aspect and consequently the quality of the estimate. The exact size depends on F and on the movement errors but, when the errors are small, it remains close to that in the absence of errors. Hence, for the lateral sonar, ΔR remains close to 2 vT so that it is necessary, as has been seen, to oversample the synthetic antenna in order to have sufficient angular resolution. For the frontal sonar, ΔR is close to 2 vT/tan θ, as can be seen in FIG. 9. The size of the sub-antenna is thus close to L in the center transmission axis, but it decreases towards the extremities of the sector, which limits the aperture thereof.

These limitations can be circumvented by implementing auxiliary transmissions as in the prior art, particularly by using the dual-frequency alternate transmission mode introduced in [3]. For the frontal sonar as well as the lateral sonar, any shifting on transmission of ΔE in the appropriate direction, where ΔE is the separation between the transmitters, makes it possible correspondingly to reduce the amplitude of the supplementary shift to be applied on reception. Thus the size of the sub-antenna is lengthened by ΔE with respect to the case where the shift is effected solely on reception.

Hence, for the conventional lateral sonar, in which there is a shift of D=L/2 between two recurrences, it is possible to use a sub-antenna size of close to ΔE. It is therefore not beneficial to reduce the aperture of the transmission sector. In the embodiment example of [3] recalled above, the transmission is therefore over the entire 8° sector, and this sector is covered by a plurality of channels on reception the resolution of which is, for the values adopted in [3], close to 0.2°, which is better than forming channels on transmission.

Figure 10:
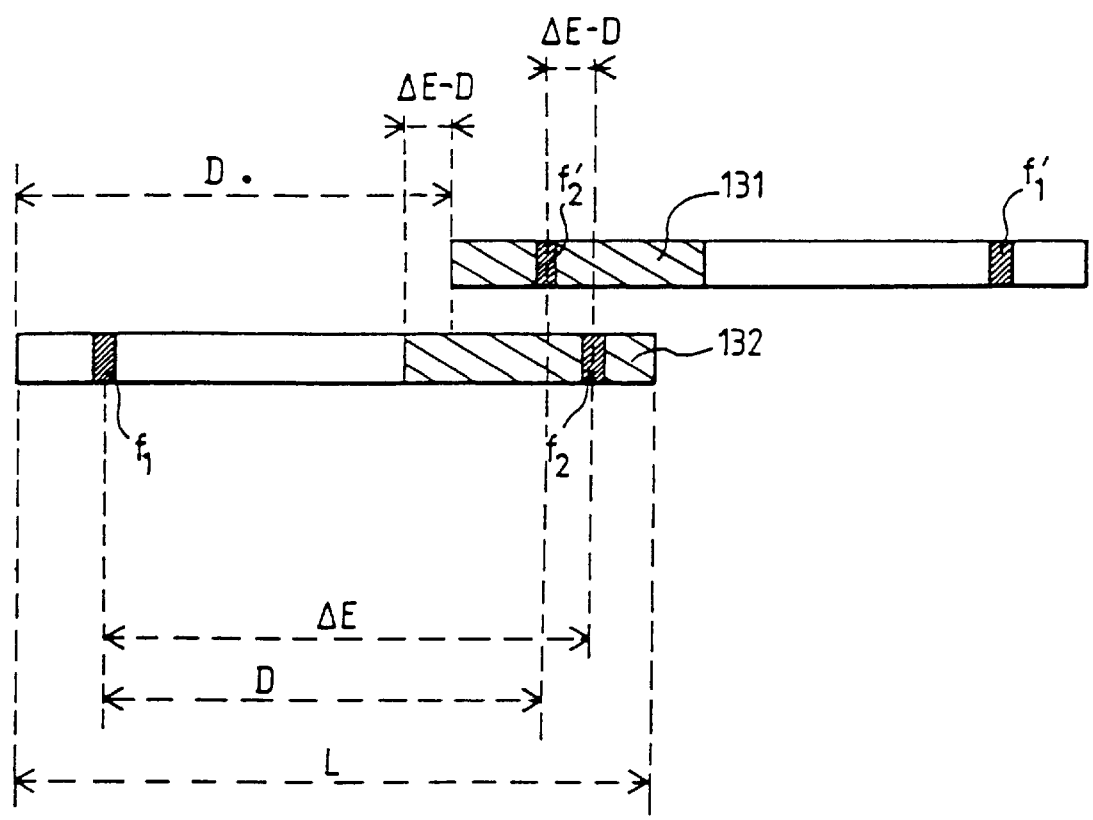
FIG. 10, a representation of the sub-antenna in the case where the shifting is carried out simultaneously on transmission and reception and where the physical antenna is shifted by more than L/2 between two consecutive recurrences.

The method remains applicable even for a lateral sonar shifting by D>L/2, that is to say when the synthetic antenna is conventionally under-sampled, with a sub-antenna size close to L−2D+ΔE as in FIG. 10. Patent application No. 9,615,157, filed on Oct. 12, 1996, describes a synthetic antenna for which such a shifting is envisaged.

In FIG. 10, only the two auxiliary frequencies $F_1$ and $F_2$ have been represented, serving for auto-focusing ($f_2$ for the pair of recurrences of the figure) and not the frequency serving for the imaging.

This dual-frequency auxiliary transmission mode can also be used for a frontal sonar. It is possible, for example, to divide the transmission sector into three equal sub-sectors. In the sub-sector close to the central axis, auto-focusing is carried out in the principal sub-band with a sub-antenna close to L in size. In each of the other two sub-sectors, one of the two auxiliary sub-bands 1 and 2 is used: if the center of phase of the auxiliary transmitter transmitting code 1 moves from port to starboard, sub-band 1 is used in the starboard sub-sector, and vice versa.

The extension of the whole of the method to any number K of recurrences is done step by step: in order to readjust 1 and K, 1 and 2 are readjusted, then 2 and 3, etc., then K−1 and K. When the passband of the movement errors and of the fluctuations of the medium is smaller than the recurrence frequency, the estimates can be low-pass filtered in order to enhance accuracy.

In one embodiment example, a synthetic mode of a lateral surveillance sonar is considered. The sonar operates around 400 kHz with an antenna of $L_r$=1.60 m. In physical mode, this sonar makes it possible to operate at a maximum speed of 10 knots with a resolution of about 20 cm at the maximum range of 100 m. The synthetic linear mode allows a resolution of 5 cm at 100 m at the same speed of 10 knots on condition that the transmission sector is widened, for example to 5° in order to avoid any stabilization on transmission, and that two transmitters are available the centers of which are separated laterally by about ΔE=1.30 m. One of these two transmitters transmits the principal code and the two transmitters transmit the two auxiliary codes alternately. The passband of the three transmissions is of the order of 10 kHz. The minimum size of the isoplanetic regions is then of the order of 10 cm at 100 m.

What is claimed is:

1. A method for sonar image processing, comprising:
   (a) selecting first and second sub-antenna arrays at respective first and second ends of an array antenna;
   (b) forming a first communications channel aimed at a target image point using the first sub-antenna array to determine first coordinates of the target image point at a first sonar pulse recurrence time;
   (c) forming a plurality of second communication channels aimed at a target image sector containing the target image point using the second sub-antenna array at a second successive sonar pulse recurrence time;
   (d) selecting one of the plurality of second channels which maximizes an intercorrelation peak between the first communication channel and each of the plurality of second communication channels and determining second coordinates of the target image based on the selected second communications channel; and
   (e) determining sonar coordinates for the target image point jointly using first and second coordinates.

2. The method according to claim 1, further comprising:
   repeating steps (a) through (e) for two directions of shifting the first sub-antenna array and the second sub-antenna array and for a plurality of sizes of the first and second sub-antenna arrays; and
   selecting a first sub-antenna array direction and a first sub-antenna array size and a second sub-antenna array direction and a second sub-antenna array size which maximizes the intercorrelation peak between the first communication channel and each of the plurality of second communication channels.

3. The method according to claim 1, further comprising:
   repeating steps (a) through (e) for a grid of target image points at first sonar pulse recurrence times, wherein sonar coordinates estimated from a prior pair of first and second sonar pulse recurrence times at a point adjacent the target image point are used as initial conditions and the whole of two images obtained at each pair of first and second recurrences is readjusted between each pair of first and second recurrences.

4. The method according to claim 3, further comprising:
   making a sonar coordinate variation parametric model for a subset of the plurality of target image points; and
   estimating a set of sonar coordinates for the subset of the plurality of target image points using the sonar coordinate variation parametric model.

5. The method according to claim 3, further comprising:
   using at least one supplementary transmitter and at least one supplementary transmission code to drive said first and second sub-antenna arrays.

6. The method according to claim 1, further comprising:

using at least one supplementary transmitter and at least one supplementary transmission code to drive said first and second sub-antenna arrays.

7. The method according to claim 6, further comprising:

repeating steps (a) through (e) for a grid of target image points at a first sonar pulse recurrence time, wherein sonar coordinates estimated from a prior pair of first and second sonar pulse recurrence times at a point adjacent the target image point are used as initial conditions and the whole of two images obtained at each pair of first and second recurrences is readjusted between each pair of first and second recurrences.

8. The method according to claim 2, further comprising:

repeating steps (a) through (e) for a grid of target image points at a first sonar pulse recurrence time, wherein sonar coordinates estimated from a prior pair of first and second sonar pulse recurrence times at a point adjacent the target image point are used as initial conditions and the whole of two images obtained at each pair of first and second recurrences is readjusted between each pair of first and second recurrences.

9. The method according to claim 8, further comprising:

making a sonar coordinate variation parametric model for a subset of the plurality of target image points; and estimating a set of sonar coordinates for the subset of the plurality of target image points using the sonar coordinate variation parametic model.

10. The method according to claim 2, further comprising:

using at least one supplementary transmitter and at least one supplementary transmission code to drive said first and second sub-antenna arrays.

11. The method according to claim 8, further comprising:

using at least one supplementary transmitter and at least one supplementary transmission code to drive said first and second sub-antenna arrays.

* * * * *